US008051179B2

(12) United States Patent
Angal et al.

(10) Patent No.: US 8,051,179 B2
(45) Date of Patent: Nov. 1, 2011

(54) DISTRIBUTED SESSION FAILOVER

(75) Inventors: Rajeev Angal, San Jose, CA (US);
Subash Penumatsa, Santa Clara, CA (US); Ching-Wen Chu, San Jose, CA (US); Ajay Sondhi, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1437 days.

(21) Appl. No.: 11/346,390

(22) Filed: Feb. 1, 2006

(65) Prior Publication Data

US 2007/0192326 A1     Aug. 16, 2007

(51) Int. Cl.
*G06F 15/16* (2006.01)
*G06F 11/00* (2006.01)

(52) U.S. Cl. ............ 709/227; 709/217; 709/229; 714/2; 714/4.11; 714/48

(58) Field of Classification Search .................. 709/227, 709/229
See application file for complete search history.

(56) References Cited

U.S. PATENT DOCUMENTS

| | | | |
|---|---|---|---|
| 5,696,895 A * | 12/1997 | Hemphill et al. | 714/4 |
| 6,487,547 B1 * | 11/2002 | Ellison et al. | 707/2 |
| 6,553,401 B1 * | 4/2003 | Carter et al. | 709/200 |
| 7,124,320 B1 * | 10/2006 | Wipfel | 714/13 |
| 7,234,075 B2 * | 6/2007 | Sankaran et al. | 714/13 |
| 7,308,502 B2 * | 12/2007 | Rouault | 709/229 |
| 2003/0014526 A1 * | 1/2003 | Pullara et al. | 709/227 |
| 2006/0168334 A1 * | 7/2006 | Potti et al. | 709/239 |
| 2006/0248119 A1 * | 11/2006 | Stanev et al. | 707/104.1 |

OTHER PUBLICATIONS

Mark Harper, et al. "Java Message Service" JMS Publish/Subscribe Model, Sun Microsystems, Version 1.1, Apr. 12, 2002, pp. 75-85.

\* cited by examiner

*Primary Examiner* — Asad M Nawaz
*Assistant Examiner* — Farzana Huq
(74) *Attorney, Agent, or Firm* — Osha • Liang LLP

(57) ABSTRACT

A distributed session failover mechanism is disclosed for facilitating the replication and retrieval of session information. A first server, in a trusted network, providing a single sign-on (SSO) solution, stores session information pertaining to a particular client requesting services associated with the server. In order to provide session failover, the first server sends a copy of the session information to a bus mechanism, which is connected to one or more persistent repositories. When a second server attempts to validate the client, the second server may discover that the first server failed. The second server then requests a copy of the session information pertaining to the client from the bus mechanism. The bus mechanism retrieves the copy from a persistent repository and provides the copy to the second server.

12 Claims, 5 Drawing Sheets

DISTRIBUTED SESSION FAILOVER

BACKGROUND

Websites have greatly proliferated in recent years. The number of services provided by websites has also grown quite rapidly, to the point that almost any type of service may now be obtained via the Internet. The growth in the number of websites has largely occurred without any concerted effort to integrate the various sites. That is, each website has typically been created and maintained as a standalone site, and has generally not been constructed to interact, cooperate, or share information with other websites. As a result, users generally have to maintain a separate and distinct user account on each website. For example, a user may have one account on a book vending website, another account on a computer system vending website, yet another account on a travel agency website, and so on. Having all of these accounts generally forces the user to remember a user name and password for each account. In addition, because each website is its own standalone site, the user typically has to log in separately to each website to use the services provided thereon. Furthermore, the user generally has to provide the same set of information (e.g. first name, last name, address, etc.) over and over again to the various sites, which can be time consuming and tedious.

In an attempt to enable separate websites to interact and share information with each other (thereby, easing the burden on the user), an organization known as the Liberty Alliance has been formed. The Liberty Alliance is a standards organization that has established a Liberty standard, which governs interaction between various websites. The Liberty standard sets forth standard protocols and schemas that can be used to facilitate such interaction. As it currently stands, the Liberty standard comprises two major aspects: a federation framework and a web services framework.

The federation framework makes it possible to set up a circle of trust among a plurality of websites. Within this circle of trust, account linking can be implemented such that an account on one website can be mapped to an account on another website. With such account linking, it is possible to achieve single sign-on (SSO), whereby a user logs in to an account on just one of the websites within the circle of trust and can thereafter access accounts on other websites within the circle of trust without having to log in to those websites. While the accounts on the various websites are linked, the information in the accounts is not necessarily shared (unless the parties specifically agree to share some or all of the information). Thus, with the federation framework, the information in each account remains private to its associated website.

The web services framework enables information to be easily shared among a plurality of websites. With the web services framework, a user can maintain information in a central repository located at one of the websites, and can direct other websites to consult that central repository to obtain information pertaining to the user. For example, a user can maintain his personal profile information (e.g. name, address, phone number, etc.) at a website A. When the user visits a website B (which may, for example, be a website that sells certain goods), and website B requires certain information about the user (for example, an address to which to ship a purchased item), website B can request the user information from website A. With the web services framework, the user does not have to provide his information to each website that he patronizes.

Some application servers that provide SSO service include BEA's Weblogic™, IBM's Websphere™, and Sun's Access Manager™. Sun's Access Manager may also be used in conjunction with (i.e. run on top of) other application servers and web servers to provide the SSO services. Access Manager (AM) servers implement SSO at a different level than other application servers, and are thus able to employ SSO and capabilities independent of the application servers on which they might be executing. AM servers will be used hereinafter in discussing SSO and a failover mechanism associated with SSO.

When a client process requests access to resources from an AM server, the client may be a "dumb" client, such as a web browser, or one or more "intelligent" clients, such as some applications. Using a web browser as an example, when a user first requests access to an account and authenticates herself, a cookie is created on the web browser. Also, a session is created on the AM. The AM that creates the session owns the session. If the user logs out, there must be a single authority to say whether the session is still valid.

A session contains information related to the user's authentication, when the user logged on, how long the user has been idle, the expiry time, and other attributes. In the case of a "dumb" client, the session information also maintains the work that the client has performed thus far. However, an "intelligent" client is intelligent enough to retain its own state, or the work performed thus far.

When the user accesses a second AM server in the trusted network with a web browser, either within the same enterprise or a different enterprise, the cookie is presented to the second AM server. The cookie contains a session token, which is typically a 64-bit number that specifically identifies the session originally created when the user first logged on. The second AM validates the session token by making a back channel call to the first AM server which owns the session. The first AM server verifies to the second AM server that the user has been authenticated and that the particular session associated with the user has not expired. The second AM server then allows the user access to resources provided by the server associated with the second AM server. This communication between the AM servers is transparent to the user; thus, the user can travel amongst different websites without having to re-authenticate and without knowledge of the validation process.

Failover

When the second AM server makes the back channel call to validate a user, the second AM server may discover that the first AM server (the owner of the session in question) crashed. If an AM server fails or crashes, all the session information stored on the AM server is lost. This means the user may lose all the work done thus far and the user would have to re-authenticate.

One failover approach to recover the lost session information is to initially replicate the session information on all AM servers. FIG. 1 illustrates a system 100 wherein session information pertaining to a client 102 is replicated on each AM server in a SSO trusted network. Client 102 and session servers 106-110 in the SSO trusted network may be communicatively coupled via a network 104, which may be a Local Area Network (LAN) or a Wide Area Network (WAN), such as the Internet.

Each server in the SSO trusted network has a copy of each session created in the SSO trusted network. If server 106 crashes, then every other server continues functioning without losing SSO capability and without a significant change in network performance. However, given normal network usage, the implementation of system 100 suffers from increased network latency, due to sending session copies to each server in the SSO trusted network. Also, depending on network usage, a significant amount of memory is consumed by each server in the SSO trusted network when the total number of servers reaches four and above.

Another approach is to have one or more persistent repositories, such as databases, store all the sessions for each AM server. FIG. 2 illustrates a system 200 wherein session information pertaining to client 102 is replicated, and wherein a session server (e.g., server 106) directly sends a copy of session information to each persistent repository. For example, client 102 initiates a session on server 106 via network 104. Server 106 then sends information pertaining to the session directly to a database, such as a database 210. If there are multiple databases (to ensure that there is not a single point of failure with respect to the databases), then a copy of the session is sent to each database, such as databases 212-214.

Subsequently, client 102 requests resources from server 108 via network 104. In order to validate client 102 without requiring client 102 to re-authenticate, server 108 determines that server 106 owns the session and sends a request to server 106 to determine if a session pertaining to client 102 is open. If server 108 determines that server 106 is somehow unavailable, then server 108 requests a copy of the session information directly from one of the databases (e.g., databases 210-214).

This latter approach suffers from at least three undesirable shortcomings. The first is that, when a server sends a copy of session information to each database, the server must know about each database and communicate directly with each database (i.e. peer-to-peer). This means that the server must wait for a COMMIT message from each database to ensure that the copy of the session information was properly saved before the server can return to its regular task of storing session information and providing SSO capability. This synchronous trait becomes a significant performance bottleneck to each server.

The second undesirable feature occurs when a server holding a large number (e.g., 100,000) of sessions fails. There could be, for example, five servers requesting copies of desired session information from the same database. Each server would have to wait their respective turn in order to obtain the copy of the session information from the database.

Third, each server in the SSO trusted network of FIG. 2 is required to be aware of each database. Thus, information pertaining to each database needs to be maintained as well as persistent connections between each server and each database. System 200 is thus not scalable since m database connections need to be created whenever a new server is added to the SSO trusted network of FIG. 2. Correlatively, n server connections need to be created whenever a new database is added to the SSO trusted network. Furthermore, if the new database uses a different protocol than that which is used for any of the other databases in system 200, then the logic of each server in the SSO trusted network of FIG. 2 needs to be updated in order to be able to communicate with the new database.

Based on the foregoing, a need exists for an improved session failover mechanism.

SUMMARY

In the session failover context, the steps of replicating and retrieving session information from persistent repositories can be a source of significant performance degradation. In the case where each server replicates session information on one or more other servers, adding additional servers with SSO and failover capability increases network latency and memory consumption.

In the case where each server has a peer-to-peer connection with each database, increasing the number of servers and databases in the system (e.g., system 200 in FIG. 2) increases the time required to store and retrieve copies of session information. Also, when a server must directly communicate with multiple persistent repositories (e.g., databases) in order to send and request session information, system performance significantly degrades. Existing failover mechanisms, indeed, are not very scalable.

In light of this observation, one embodiment of the present invention provides a highly scalable mechanism for storing and retrieving session information in a failover context. An asynchronous interaction model is provided wherein a first server stores session information pertaining to a session associated with a client by providing a copy of the session information to a bus mechanism. The bus mechanism handles the request to store the copy of the session information and ensures that the information is stored in each of the databases in case of a server crash. The first server not only does not interact with any of the databases, it is not even aware of the databases. Therefore, the improved failover mechanism provides faster delivery of copies of session information when storing the copies in a persistent repository.

Upon the failure of the first server, a second server, which is attempting to service the request of the client whose session is owned by the first server, determines that the first server is down. The second server then sends a request to the bus mechanism to obtain the copy of session information pertaining to the client. The bus mechanism ensures that the necessary copy of session information is retrieved from one of the databases and is forwarded to the second server. The bus mechanism determines which database is best able to handle the request. Again, the second server does not interact with any of the databases and is unaware of the databases. Thus, multiple session servers will never make direct connections to any particular database, which would result in a significant decrease in performance. Therefore, the improved failover mechanism provides faster recovery of session information when a server offering a SSO solution fails.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENT(S)

Distributed Session Failover System

Figure 3:
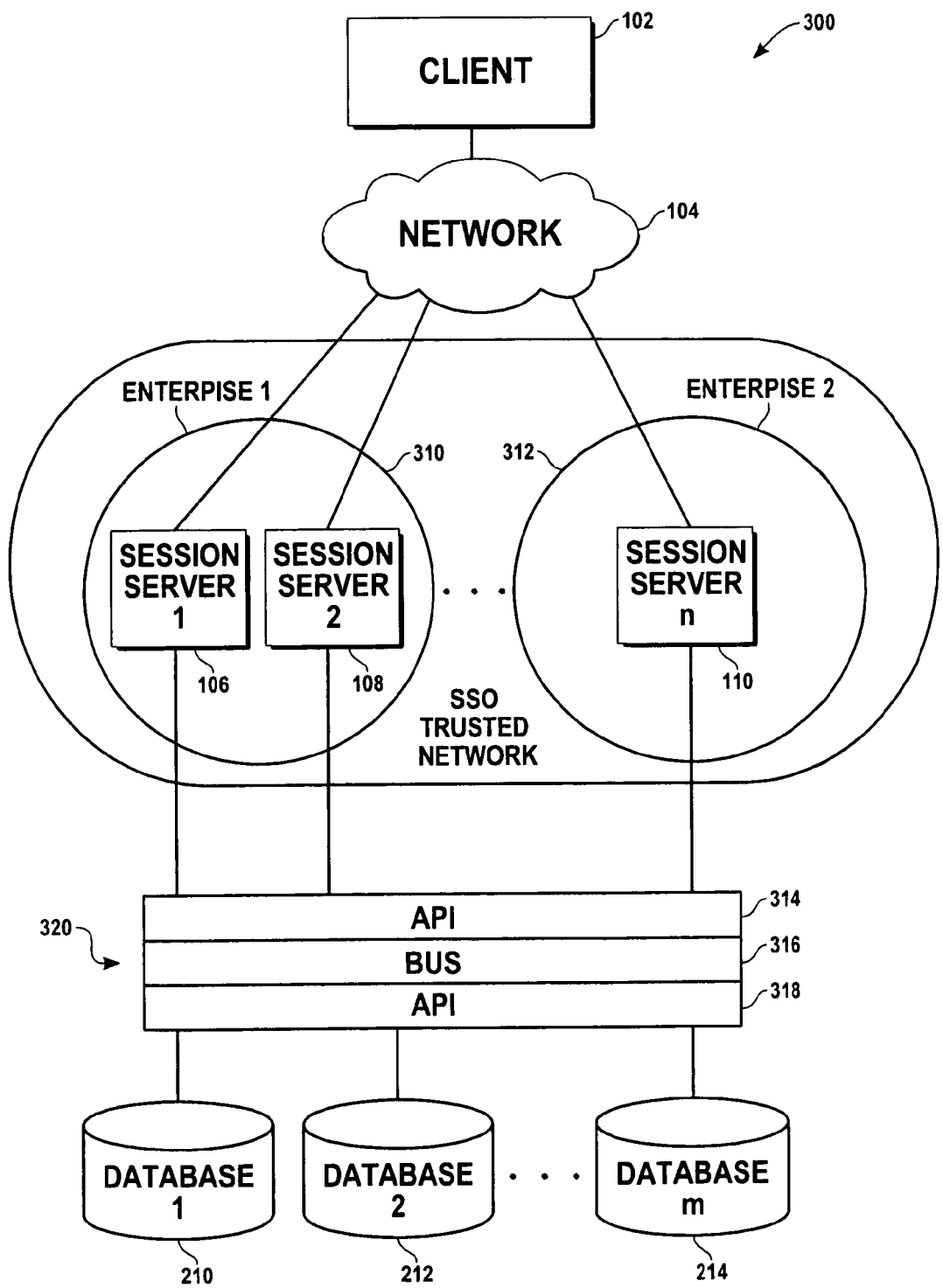
FIG. 3 illustrates a system for replicating and retrieving session information, wherein a session server sends a copy of session information to a bus mechanism, according to one embodiment of the invention.

FIG. 3 illustrates a system 300 for replicating and retrieving session information, wherein session server 106 sends a copy of session information to a bus mechanism 320, according to one embodiment of the invention. When client 102 requests resources (i.e., services and/or information) from a web server or an application server, a session is created for client 102, such as on server 106. Server 106 may have required the client to authenticate itself before resources are provided. Server 106 stores session information pertaining to the session associated with client 102 locally and sends a copy of the session information to bus mechanism 320.

When client 102 requests resources from a different web or application server in the SSO trusted network of FIG. 3, another session server, such as server 110, may validate client 102 (i.e., determines whether the client has signed on previously). Server 110 may be part of the same enterprise (e.g., network) as server 106 or part of a different enterprise, as depicted in FIG. 3.

A load balancer may determine which server will serve the client's request by determining which server is least loaded. A load balancer may be implemented as its own layer between client 102 and session servers 106-110 in the SSO trusted network, or the load balancer may be implemented on client 102.

Figure 4:
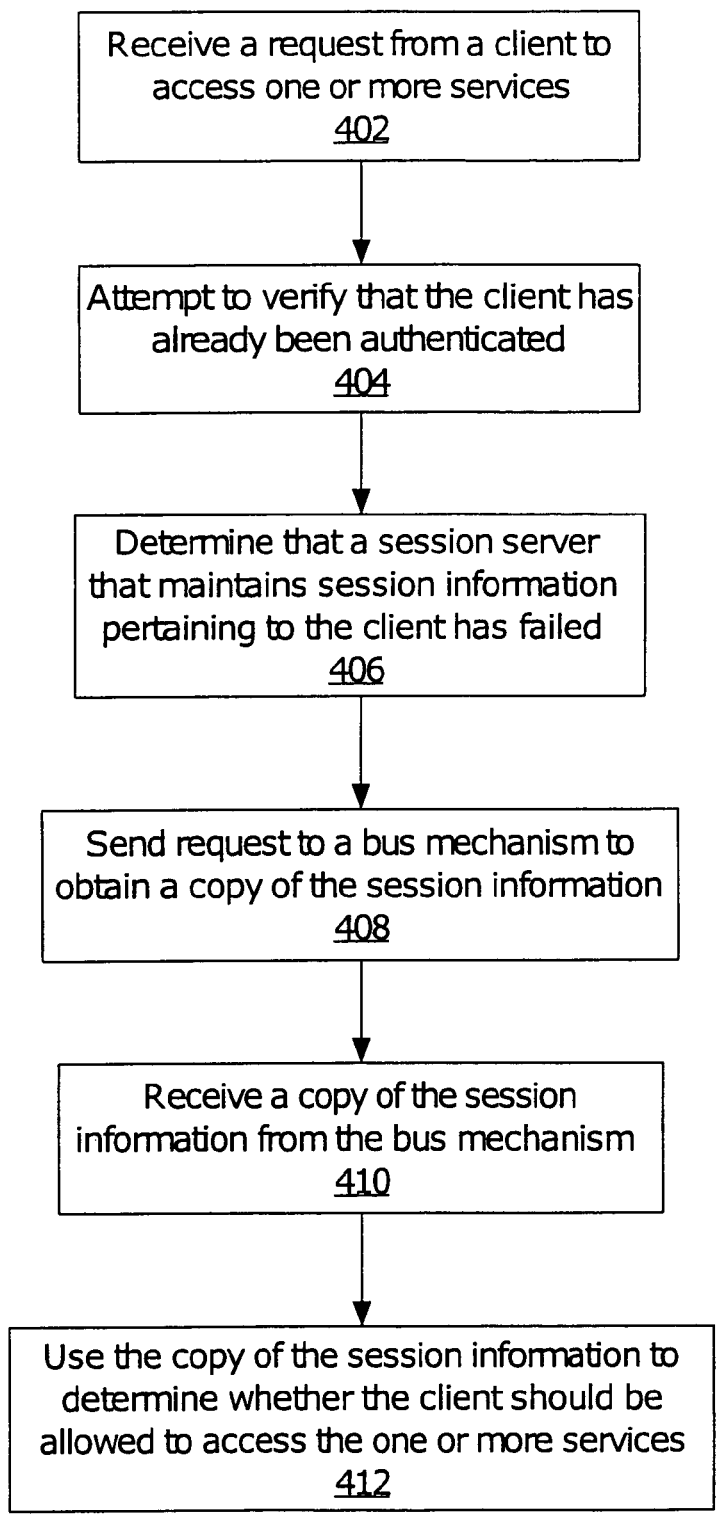
FIG. 4 is a flow chart illustrating a process for retrieving session information when a session server fails, according to one embodiment of the invention.

FIG. 4 is a flow chart illustrating a process for retrieving session information when a session server fails, according to one embodiment of the invention.

Upon receiving a request from client 102 to access one or more services (block 402), server 110 makes a back channel call to server 106 to determine whether client 102 has already been authenticated and/or is still authenticated, without prompting client 102 to re-authenticate (block 404).

One way to determine which server originally authenticated client 102 is to use cookies stored locally on client 102. Client 102 reveals its cookie to server 110 upon the client 102's request for resources. The cookie contains a number, typically 64-bit, that identifies which server authenticated client 102.

Upon discovering that server 106 has failed (block 406), server 110 requests a copy of the sought-after session information from bus mechanism 320 (block 408). In the case where the client had already been authenticated and the session information was stored properly, bus mechanism 320 returns a copy of the session information to server 110 (block 410). Client 102 may then be validated without having to re-authenticate if other factors indicate that the session created for client 102 has not lapsed (block 412).

Figure 1:
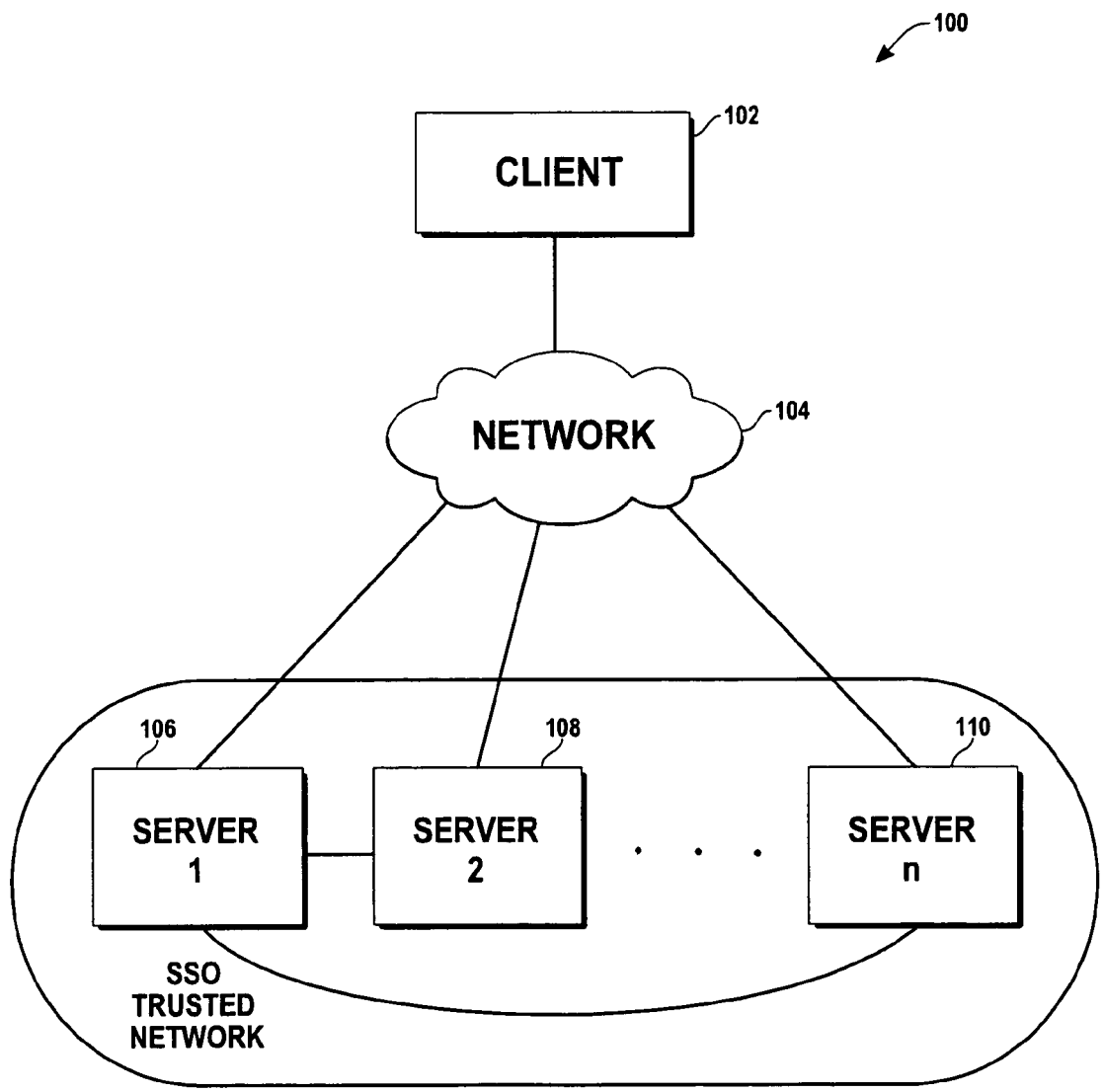
FIG. 1 illustrates a system wherein session information pertaining to a client is replicated to each session server in a SSO trusted network.
Figure 2:
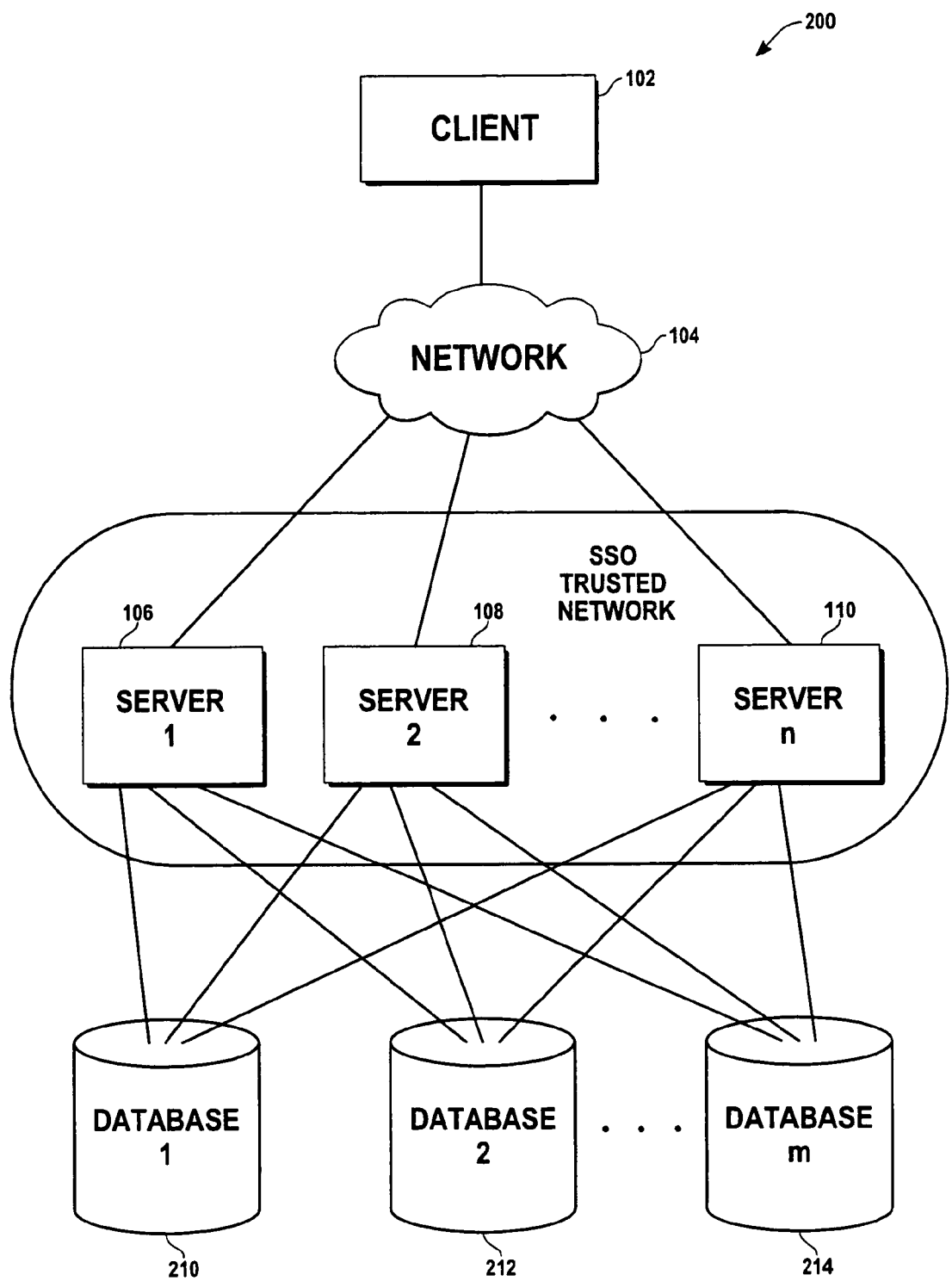
FIG. 2 illustrates a system wherein session information pertaining to a client is replicated, and wherein a session server directly sends a copy of session information to each persistent repository.

Thus, the distributed session failover system disclosed herein is highly scalable because any number of servers and persistent repositories, such as databases 210-214, may be added without experiencing a significant increase in network traffic or complexity. For example, suppose a peer-to-peer system, such as system 200 of FIG. 2, is employed and there are n session servers and m persistent repositories. Further suppose that another session server providing failover capabilities is added to system 200. In such a case, m additional connections would have to be made, wherein each connection is from the new session server to a persistent repository among the m persistent repositories.

According to an embodiment of the invention, a single additional connection to the bus mechanism is required to handle all the pushing and pulling of requests between the new server and bus mechanism 320. In contrast, if a single persistent repository is added to a session failover system employing a peer-to-peer mechanism, then n additional connections would have to be made, instead of just one connection using the mechanism disclosed herein. Furthermore, each of servers 106-110 may continue

Bus Mechanism

According to an embodiment of the invention, bus mechanism 320 is comprised of APIs 314 and 318, and bus 316 that comprises multiple brokers. Bus mechanism 320 may be implemented using the Java Message Service (JMS) bus. JMS includes a JMS provider (e.g., bus 316) and a set of message interfaces (e.g., APIs 314 and 318) that allow clients (e.g., servers 106-110) to send (publish) and receive (subscribe) messages.

Server 106 initially sends a message containing a copy of session information to bus 316 via API 314. APIs 314 and 318 allow clients to invoke the brokers of bus mechanism 320. A broker is a process with its own queue that may operate in a First-In First-Out (FIFO) manner. The broker is responsible for the reliable delivery of each request.

With APIs 314 and 318, such as the interfaces defined by JMS and described below, a particular broker is used to forward from a session server (i.e. publisher) the message containing the copy of session information to the one or more persistent repositories, such as databases 210-214. Brokers are configured with the session server. Either the session server is explicitly supplied with a list of brokers or brokers are stored in a JNDI context. In the former case, the session server merely passes this list to the JMS API (i.e. API 314 in FIG. 3). The APIs determine which broker to contact.

In the latter case, JMS clients look up configured JMS objects using the JNDI (or Java Naming and Directory Interface) API. JMS administrators use provider-specific facilities for creating and configuring these objects. This division of work maximizes the portability of clients by delegating provider-specific work to the administrator. It also leads to more administrable applications because clients do not need to embed administrative values in their code.

Alternatively, if server 110 determines that server 106 has failed, then a session server (i.e. subscriber) sends a message for requesting a copy of session information from bus mechanism 320 via API 314. Once a suitable broker is determined, the broker forwards the message via API 318 to a persistent repository (e.g., database 210) among the one or more persistent repositories to retrieve a copy of session information. Specifically, the broker publishes the request to each of the persistent repositories and at least one of the two things may happen. One, all the persistent repositories that have the session may respond (and those repositories that that don't have the session never respond) and the recipient session server (i.e. subscriber) uses the first response that came from persistent repositories. Or two, one of the persistent repositories can be designated as the responder based on a predefined arrangement.

Java Message Service

Enterprise messaging products treat messages as lightweight entities that consist of a header and a body. The header contains fields used for message routing and identification; the body contains the application data being sent. Within this general form, the definition of a message varies significantly across products. There are major differences in the content and semantics of headers. Some products use a self-describing, canonical encoding of message data; others treat data as completely opaque. Some products provide a repository for storing message descriptions that can be used to identify and interpret message content; others don't.

Generally, JMS messages are composed of a header and a body. Standard header fields contain values used by both clients and providers to identify and route messages. In addition to the standard header fields, messages provide a built-in facility for adding optional header fields to a message, such as application-specific header fields provider-specific header fields. JMS also defines several types of message bodies which cover the majority of messaging styles currently in use.

The interfaces provided by JMS include a TopicConnectionFactory, TopicConnection, Topic, TopicSession, TopicPublisher, and TopicSubscriber. A TopicConnectionFactory is an administered object used by a client to create a TopicConnection, which is an active connection to a JMS provider (e.g. bus 316).

A TopicSession is a single-threaded context for sending and receiving messages. A TopicSession provides methods for creating TopicPublishers, TopicSubscribers, and TemporaryTopics. It also provides the unsubscribe method for deleting its client's durable subscriptions. If there are messages that have been received but not acknowledged when a TopicSession terminates, then a durable TopicSubscriber must retain and redeliver them; a nondurable subscriber need not do so.

A TopicPublisher is an object created by a TopicSession that is used for sending messages to a destination. Lastly, a TopicSubscriber is an object created by a TopicSession that is used for receiving messages sent to a destination.

A Topic object encapsulates a provider-specific topic name. It is the way a client specifies the identity of a topic to JMS methods. A Topic object gathers and distributes messages addressed to it. By relying on the Topic as an intermediary, message publishers are kept independent of subscribers and vice versa. The Topic automatically adapts as both publishers and subscribers come and go. Publishers and subscribers are active when the Java objects that represent them exist. JMS also supports the optional durability of subscribers that "remembers" the existence of subscribers while they are inactive.

A TemporaryTopic is a unique Topic object created for the duration of a Connection or TopicConnection. TemporaryTopic is a system-defined Topic that can be consumed only by the Connection or TopicConnection that created it.

Many publisher/subscriber (Pub/Sub) providers group topics into hierarchies and provide various options for subscribing to parts of the hierarchy. JMS places no restrictions on what a Topic object represents. It might be a leaf in a topic hierarchy, or it might be a larger part of the hierarchy (for subscribing to a general class of information). The organization of topics and the granularity of subscriptions to them is an important part of a Pub/Sub application's architecture. JMS does not specify a policy for how this should be done. If an application takes advantage of a provider-specific topic grouping mechanism, it should document this. If the application is installed using a different provider, it is the job of the administrator to construct an equivalent topic architecture and create equivalent Topic objects.

Advantages of Bus Mechanism 320

Bus mechanism 320 allows the session servers in the SSO trusted network to invoke and query (e.g., push and pull session information to and from) persistent repositories without having to know about the individual persistent repositories. Thus, the session servers in the SSO trusted network are not required to interact directly with any of the persistent repositories. In fact, the session servers do not even have to be aware of the existence of any persistent repository.

Furthermore, a session server in the SSO trusted network is assured that once it has submitted a set of session information to bus mechanism 320, the set of session information will be stored in the one or more repositories. This is because bus mechanism 320 has multiple brokers for fault tolerance; if one broker goes down, the session information is still stored in the one or more repositories (e.g., by a backup broker). Thus, the session server may continue operating without having to wait on the persistent repositories to each individually commit their push operations.

Another benefit from utilizing bus mechanism 320 in a SSO failover context is that when a session server transfers responsibility to the broker for saving session information on each of the persistent repositories, the session server does not have to wait for the session information to save properly and return an acknowledgement of that such saving occurred. The session server may continue providing SSO capabilities even before the session information is saved in any of the persistent repositories. Therefore, bus mechanism 320 helps to free up computing resources for each of servers 106-110 that bus mechanism 320 serves.

Hardware Overview

Figure 5:
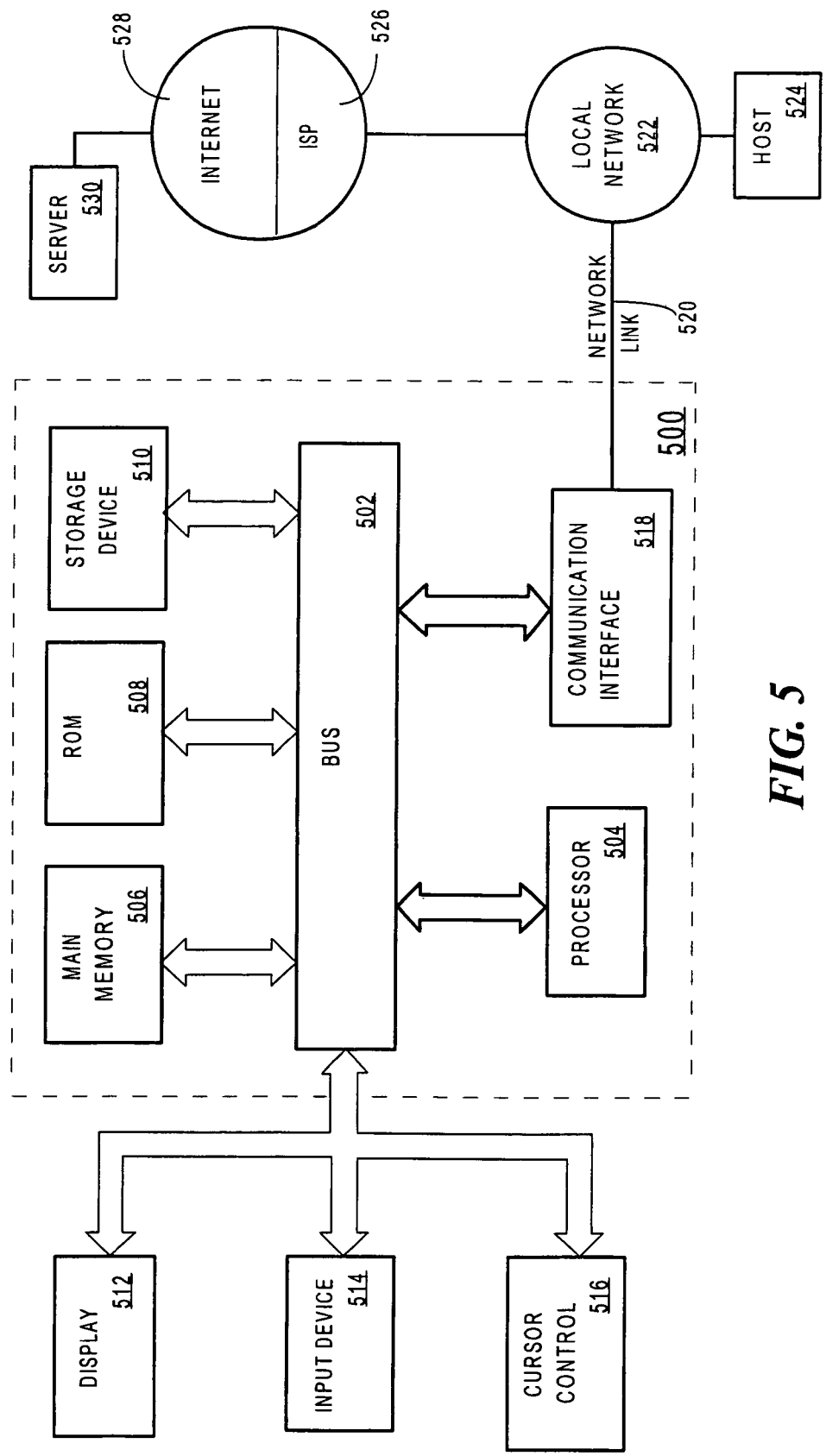
FIG. 5 is a block diagram of a general purpose computer system in which one embodiment of the present invention may be implemented.

In one embodiment, the servers in the SSO trusted network and bus mechanism 320 may be implemented using hardware logic components, or may take the form of sets of instructions that are executed by one or more processors. If they take the form of sets of instructions, FIG. 5 shows a block diagram of a computer system 500 upon which these sets of instructions may be executed. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512 for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may further be a network connection that connects one or more of the components. Any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 500, various machine-readable media are involved, for example, in providing instructions to processor 504 for execution. Such a medium may take many forms, including but not limited to, non-volatile media, and volatile media. Non-volatile media includes, for example, optical or magnetic disks, such as storage device 510. Volatile media includes dynamic memory, such as main memory 506.

Common forms of machine-readable media include, for example, a floppy disk, a flexible disk, hard disk, magnetic tape, or any other magnetic medium, a CDROM, DVD, or any other optical storage medium, punchcards, papertape, any other physical medium with patterns of holes, a RAM, a PROM, and EPROM, a LASHEPROM, any other memory chip or cartridge, or any other physical medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and transmit the data to the appropriate circuitry which can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A method for obtaining session information, comprising:

receiving, by a first session server, a first request from a client to access one or more services, wherein the request comprises information indicating a particular session, wherein the particular session was previously established by a second session server;

determining, by the first session server, that the second session server failed, wherein the session information associated with the particular session is stored on the second session server;

in response to the determination that the second session server failed, sending, by the first session server, a second request to a bus mechanism to obtain the session information, wherein the session information is stored in at least one of a plurality of persistent repositories, wherein the first session server is unaware of the plurality of persistent repositories, and wherein the first session server does not interact with any of the plurality of persistent repositories;

in response to receiving the second request:

selecting, by the bus mechanism, a target persistent repository of the at least one of the plurality of persistent repositories;

retrieving, by the bus mechanism, the session information from the target persistent repository;

receiving, by the first session server, the session information from the bus mechanism; and determining, by the first session server using the session information, whether the client should be allowed to access the one or more services, wherein the first session server is executing on a first computer system, wherein the second session server is executing on a second computer system, and wherein the bus mechanism is executing on a third computer system.

2. The method of claim 1, wherein each of the plurality of persistent repositories is a database.

3. The method of claim 1, wherein the bus mechanism comprises at least two application programming interfaces and at least one broker.

4. The method of claim 1, wherein the bus mechanism comprises a plurality of bus mechanisms.

5. The method of claim 1, wherein the first session server and the second session server are logically located in different networks.

6. A machine implemented method for carrying out distributed session failover by a first server, comprising:

storing, by a second server, session information associated with a particular session;

providing, by the second server, the session information to a bus mechanism;

causing, by the bus mechanism, the session information to be stored in at least one of a plurality of persistent repositories, wherein the second server is unaware of the plurality of persistent repositories, and wherein the second server does not interact with any persistent repository in the plurality of persistent repositories;

receiving, by the first server, a first request from a client for services associated with the first server, wherein the client is associated with the particular session;

determining, by the first server, that the second server failed;

sending, by the first server in response to the determination, a second request to the bus mechanism to obtain the session information, wherein the first server is unaware of the plurality of persistent repositories, and wherein the first server does not interact with any persistent repository in the plurality of persistent repositories;

in response to receiving the second request:

selecting, by the bus mechanism, a target persistent repository of the at least one of the plurality of persistent repositories;

retrieving, by the bus mechanism, the session information from the target persistent repository; and providing, by the bus mechanism, the session information to the first server, wherein the first server is executing on a first computer system, wherein the second server is executing on a second computer system, and wherein the bus mechanism is executing on a third computer system.

7. A non-transitory machine readable medium, comprising instructions for causing one or more processors to:

receive, by a first session server, a first request from a client for services associated with the first session server, wherein the client is associated with a particular session;

determine that a second session server failed, wherein the second session server has stored session information associated with the particular session;

send, by the first session server in response to the determination, a second request to a bus mechanism to obtain the session information, wherein the session information is stored in at least one of a plurality of persistent repositories, wherein the first session server is unaware of the plurality of persistent repositories, and wherein the first session server does not interact with any persistent repository in the plurality of persistent repositories;

in response to receiving the second request:

select, by the bus mechanism, a target persistent repository of the at least one of the plurality of persistent repositories;

retrieve, by the bus mechanism, the session information from the target persistent repository;

receive, by the first session server, the session information from the bus mechanism; and determine, by the first session server using the session information, whether the client should be allowed to access the services, wherein the first session server is executing on a first computer system, wherein the second session server is executing on a second computer system, and wherein the bus mechanism is executing on a third computer system.

8. The machine readable medium of claim 7, wherein each of the plurality of persistent repositories is a database.

9. The machine readable medium of claim 7, wherein the bus mechanism comprises at least two application programming interfaces and at least one broker.

10. The machine readable medium of claim 7, wherein the bus mechanism comprises a plurality of bus mechanisms.

11. The machine readable medium of claim 7, wherein the first server and the second server are logically located in different networks.

12. A system, comprising:

a first session server executing on a first computer system, configured to:

receive a first request from a client to access one or more services, wherein the request comprises information indicating a particular session, wherein the particular session was previously established by a second session server;

determine that the second session server failed, wherein session information associated with the particular session is stored on the second session server;

send, in response to the determination that the second server failed, a second request to a bus mechanism to obtain the session information, wherein the session information is stored in a plurality of persistent repositories, wherein the first session server is unaware of the plurality of persistent repositories, and wherein the first session server does not interact with any of the plurality of persistent repositories;

receive the session information from the bus mechanism, wherein the bus mechanism retrieves the session information from at least one of the plurality of persistent repositories; and use the session information to determine whether the
client should be allowed to access the one or more
services;
the second session server executing on a second computer
system; and
the bus mechanism, executing on a third computer system,
configured to:
store session information associated with the particular
session;

in response to receiving the second request:
select a target persistent repository of the plurality of
persistent repositories from which to retrieve the
session information; and
retrieve, the session information from the target persistent repository.

* * * * *